United States Patent [19]

Bond et al.

[11] Patent Number: 4,926,538

[45] Date of Patent: May 22, 1990

[54] UNIVERSAL NEST FOR A CONNECTOR ASSEMBLY TOOL

[75] Inventors: Robert H. Bond, Ewing, N.J.; Ivan Pawlenko, Holland, Pa.

[73] Assignee: American Telephone and Telegraph Company, New York, N.Y.

[21] Appl. No.: 419,301

[22] Filed: Oct. 10, 1989

[51] Int. Cl.[5] .............................................. B23Q 7/00

[52] U.S. Cl. .................................... 29/559; 29/281.1; 29/749; 29/760; 29/861; 269/52

[58] Field of Search ................. 29/749, 760, 861, 559, 29/401.1, 281.1; 269/303, 903, 52

[56] References Cited

U.S. PATENT DOCUMENTS

| | | | |
|---|---|---|---|
| 3,967,356 | 7/1976 | Holt . | |
| 3,995,358 | 12/1976 | Long et al. . | |
| 4,006,519 | 2/1977 | Long et al. | 29/749 |
| 4,014,087 | 3/1977 | Cover et al. | 29/721 |
| 4,034,472 | 7/1977 | Cover et al. | 29/749 |
| 4,238,874 | 12/1980 | Chandler et al. | 29/33 M |
| 4,434,551 | 3/1984 | Holt | 29/861 |
| 4,517,718 | 5/1985 | Johnson | 29/33 M |
| 4,642,874 | 2/1987 | Litehizer | 29/566.4 |
| 4,718,167 | 1/1988 | Moore et al. | 29/861 |

OTHER PUBLICATIONS

Viking Connectors Co., The Pushover® Tool, Jun., 1989.

*Primary Examiner*—Carl E. Hall
*Attorney, Agent, or Firm*—Robert B. Levy

[57] ABSTRACT

A universal nest (1)) for accommodating a separate one of a pair of ribbon connectors (12 and 12') of heights $h_1$ and $h_2$, respectively, comprises an elongated beam (26) along which a first block (28) of a height $h_1$ is slidably mounted. A slide (42) is slidably mounted on the upper surface (34) of the first block (28) for movement between a first position at which it overhangs a portion of the block to expose part of its upper surface, and a second position at which it overlies the upper surface (34). When the slide (42) is at its first position, the upper surface (34) will support an end of the first connector (12). The slide, when displaced to its second position, itself supports an end of the second connector (12'). A second block (60), having a pair of opposed shelves (66 and 68) of a height $h_1$ and $h_2$, respectively, is rotatably mounted to the beam (26) distant from the first block (28). By rotating the second block to position one of its shelves opposite the first block, the opposite end of the first and second connectors, respectively, may be seated on a separate one of the shelves.

7 Claims, 2 Drawing Sheets

UNIVERSAL NEST FOR A CONNECTOR ASSEMBLY TOOL

TECHNICAL FIELD

This invention relates to a universal, connector-carrying nest for use on a connector attachment tool which attaches successive pairs of wires to successive pairs of contacts in a connector.

BACKGROUND ART

Within the telecommunications industry, "ribbon"-type, multi-contact connectors are widely used for connecting multi-wire cables to each other and to various pieces of electronic equipment. A typical ribbon connector comprises a prismatically-shaped insulative block (e.g., plastic) having an upper portion which is provided with two parallel rows of opposed recesses. Within each recess is a contact which extends from the upper portion of the block into a lower portion which is adapted to mate with a complementary ribbon connector. A barb is provided on the portion of the contact exposed through the recess in the upper portion of the connector block for piercing the insulation about a wire rammed into the recess. Once the barb pierces the insulation about the wire, an electrical connection is made between the wire and the contact.

Attachment of a separate one of a pair of wires to each of a pair of contacts seated in a separate one of a pair of opposed recesses may be carried out using a connector attachment tool of the type known in the art. Examples of a connector attachment tool may be found in U.S. patent applications: Ser. No. 290,551, now Pat. No. 4,878,295, filed in the names of M. Muhlberger et al., on Dec. 27, 1988; and Ser. No. 317,262, filed in the name of K. Billingham et al., on Feb. 27, 1989; both assigned to AT&T and incorporated by reference herein. Both the Billingham et al. and Muhlberger et al. tools are comprised of a connector-carrying carriage which is incrementally advanced past each of a pair of opposed rams so that each ram is successively aligned with a separate one of the recesses in a separate one of the rows. A pair of wire guides each serve to guide a wire into alignment with a separate one of the rams which, in turn, forces the wire into the aligned recess for connection to the contact seated in the recess.

In the past, the connector-carrying carriage of each of the Billingham et al. and Muhlberger et al. tools was provided with an interchangeable nest for seating the opposed ends of the connector. Each nest served to seat a ribbon connector whose ends are of a particular height. In practice, the height of the ribbon connector ends varies from manufacturer to manufacturer. Thus, to accommodate the two most popular brands of ribbon connectors, two separate, interchangeable nests were required. The need to change nests on each of the Billingham et al. and Muhlberger et al. tools has proven inconvenient. Moreover, the need to provide separate, interchangeable nests have increased the complexity and overall cost of each tool.

Thus, there is a need for a universal nest for a connector assembly tool capable of accommodating ribbon connectors of two different heights and of different lengths as well.

BRIEF SUMMARY OF THE INVENTION

Briefly, in accordance with a preferred embodiment of the invention, a universal nest is provided for seating a separate one of a first and a second connector, each having a pair of opposed ends of a first and second height, respectively. The nest comprises an elongated base plate on which a first support means of a first height is slidably mounted for movement along the longitudinal axis of the base plate. A second support means, having a pair of opposed shelves of a first and a second height, respectively, is rotatable mounted to the base plate to enable a separate one of the shelves to be positioned opposite the first support means. A slide, of a thickness comparable to the difference between the first and second heights, is slidably mounted on the upper surface of the first support means for movement between a first position distant from the second support means, and a second position, at which the slide is positioned closer to the second support means. At the first position of the slide, a portion of the upper surface of the first support means will be exposed, allowing one end of the first connector to seat on the upper surface of the first support means. The other connector end seats on the first shelf of the second support means. When the slide is at its second position, the slide overlies the entire upper surface of the first support means, and it is the slide which serves to support one of the ends of the second connector. The opposite end of the second connector will be supported by the second shelf on the second support means.

DETAILED DESCRIPTION

Figure 1:
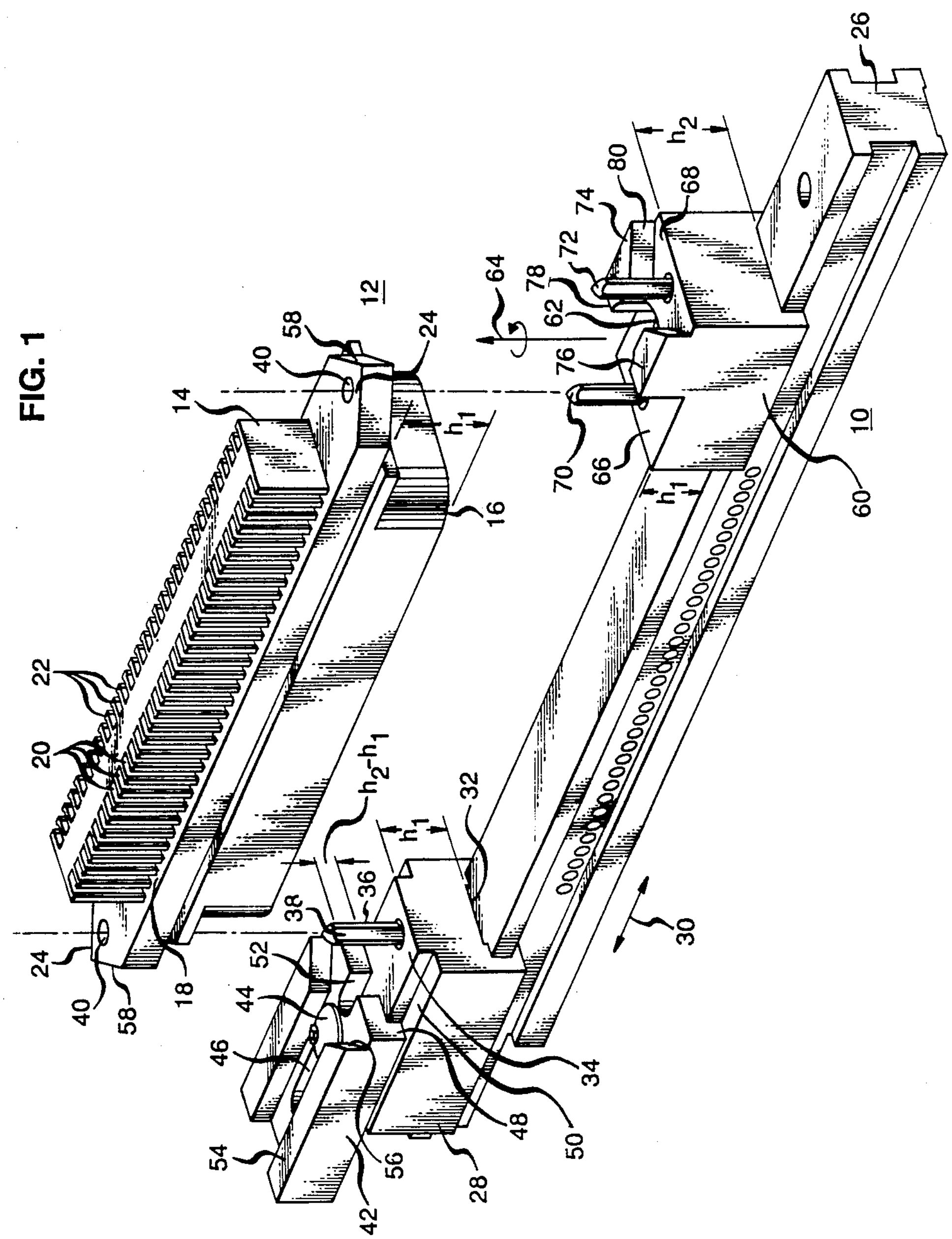
FIG. 1 is an exploded, perspective view of a universal nest in accordance with the invention, showing the nest adjusted to accommodate a first connector whose ends are at a first height.

FIG. 1 shows a perspective view of a universal nest 10, in accordance with the invention, for use on a connector attachment tool (not shown) of the type disclosed in the aforementioned Billingham et al. and Muhlberger et al. patent applications, herein incorporated by reference. As willbe understood hereinafter, the nest 10 serves to seat each of two different height ribbon connectors 12 and 12' (see FIG. 2) which are well known in the art and are available from a number of manufacturers.

Figure 2:
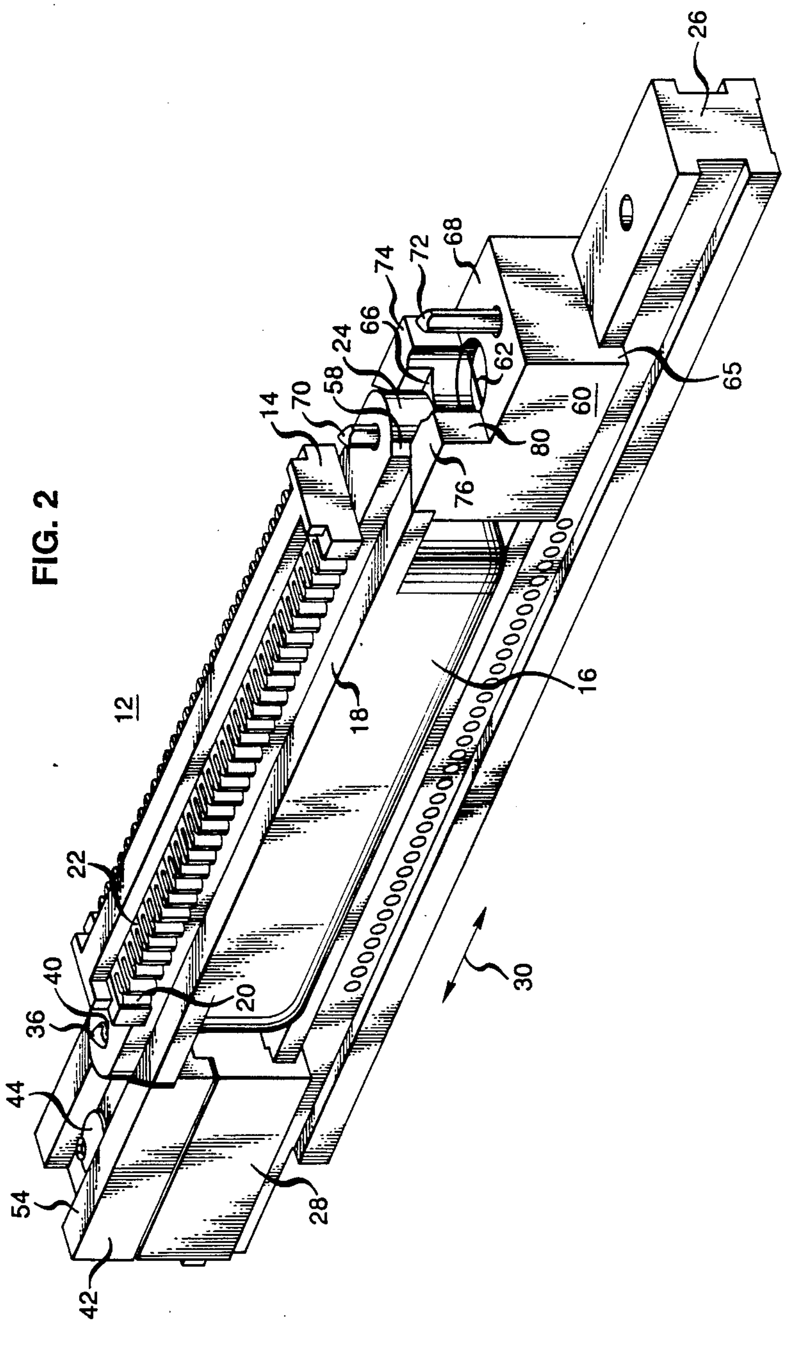
FIG. 2 is a perspective view of the universal nest of FIG. 1, showing the nest adjusted to accommodate a second connector whose ends are at a second height.

Neither of the connectors 12 and 12' comprises part of the nest 10, but to understand the construction and operation of the nest, a brief understanding of the connectors will prove useful. Each of the connectors 12 and 12' of FIGS. 1 and 2, respectively, is fabricated from plastic and has a prismatically shaped upper and lower portion 14 and 16, respectively. The upper and lower portions 14 and 16 are integral with, and extend vertically (as seen in FIGS. 1 and 2) in opposite directions from, a horizontal plate 18. The upper portion 14 of each connector is provided with two parallel rows of opposed recesses 20, each recess seating a contact 22.

The ends of the plate 18 of each connector extend horizontally in opposite directions beyond the boundary between the upper and lower connector portions 14 and 16. The outwardly extending plate portions, designated by the reference numerals 24—24, will hereinafter be referred to as the ends of the connector. The connectors 12 and 12' of FIGS. 1 and 2, respectively, differ from each other in that their ends 20 are at heights $h_1$ and $h_2$, respectively, as measured from the bottom of the lower connector portion 16. In all other respects, the connectors 12 and 12′ are practically identical to each other.

To separately accommodate the connectors 12 and 12′, the nest 10 comprises an elongated base member 26 which, in practice, comprises the connector-carrying carriage of the Billingham et al. and the Muhlberger et al. connector attachment tools (not shown). As seen in FIGS. 1 and 2, the base member 26 typically takes the form of a beam having a generally "I"-shaped cross section. A first support block 28 is slidably mounted to the beam 26 for movement along its longitudinal axis 30. In practice, the block 28 is prismatic in shape, and is provided with a slot 32 extending longitudinally through its lower portion parallel to the axis 30 so tht the block fits on, for travel along, the upper portion of the beam 26. A threaded fastener (not shown) extends vertically through the block 28 to bear against the beam 26 to hold the block in place after it has been moved along the beam to a particular position.

The block 28 is provided with a generally flat upper surface 34 which is at a height at least $h_1$ from the upper surface of the beam 26. With its upper surface 34 at a height $h_1$, the first block 28 is thus capable of supporting one of the ends 24 of the connector 12 of FIG. 1 so that the lower portion 16 of the connector clears the beam 26. A pin 36, having a set of flats 38 ground into its periphery, rises vertically upward from the upper surface 34 of the block to engage a tooling hole 40 in the connector end 24 to retain the connector in place.

A slide 42, of a thickness on the order of the difference between $h_2$ and $h_1$, is secured to the upper surface 34 of the block 28 by way of a threaded fastener 44 which extends through an elongated slot 46 in the side parallel to the axis 30. A pair of parallel, spaced-apart lips 48 depends from the bottom of the slide such that each lip is flush with a separate one of longitudinal sides of the slide. Each lip 48 rides within a separate one of a set of parallel, spaced channels 50 which run along the upper surface of the block 28 parallel to the axis 30.

When the fastener 44 is loosened, the slide 42 is constrained by the lips 48 to move parallel to the axis 30 from a first (rearward) position, depicted in FIG. 1, to a second (forward) position, depicted in FIG. 2. When the slide 42 is at its rearward position, as seen in FIG. 1, the right-hand portion of the upper surface 34 of the block 28 is exposed. Thus, one of the ends 24 of the connector 12 can be seated on the upper surface so that the pin 38 extends through the tooling hole 40. The forward (right-hand) end of the slide 42 will abut the connector end 24 seated on the upper surface of the block 28 to firmly retain it.

Referring to FIG. 2, when the slide 42 is displaced to its forward position, the slide will overlie the entire upper surface 34 of the block 28. A cutout 52 (see FIG. 1) in the forward (right-hand) end of the slide 42 permits the slide to clear the pin 38 which is typically of a greater height than the slide and thus will extend thereabove. Once the slide 42 is displaced to overlie the upper surface 34 of the block 28, the upper surface of the slide serves to seat one of the ends of the connector 12′. Since the combined height of the slide 42 and the block 28 is at least $h_2$, the slide can seat the connector end 24 of the connector 12′ while still permitting the lower portion 16 of the connector to clear the beam 26.

As seen in FIGS. 1 and 2, each of a pair of paralle, upwardly rising walls 54 runs along the upper surface of the slide so as to overlie a separate one of the lips 48. Each of the walls 54 has its forward (right-hand) end 56 cut at an angle so as to be complementary to each of a pair of angled edges 58 on each connctor end 24. In this way, when one of the connector ends 24 seats on the upper surface of the slide 42, the connector end becomes firmly engaged by the slide.

In addition to the support block 28, the beam 26 carries a second support block 60 spaced distant therefrom. A fastener 62 is threaded through the block 60 and into the beam 26 to maintain the block at a fixed position along the beam. By loosening the fastener 62, the block 60 may be rotated about a vertical axis 64, perpendicular to the axis 30. A pair of parallel, spaced-apart lips 65 (see FIG. 2) depend from the bottom of the block, each lip straddling a separate one of the longitudinal sides of the beam 26 to prevent the block from rotating once the fastener 62 is tightened.

The block 60 is provided with a pair of diametrically opposed shelves 66 and 68 of a height $h_1$ and $h_2$, respectively, from the beam 26. The heights $h_1$ and $h_2$ of the shelves 66 and 68 enable each shelf to seat one of the ends 24 of a separate one of the connectors 12 and 12′ of FIGS. 1 and 2, so the lower portion 16 of each connector will clear the beam 26. Extending upwardly from each of the shelves 66 and 68 is a separate one of a pair of pins 70 and 72, each identical to the pin 40, and each sized for receipt in the tooling hole 40 in each connector end 24.

A pair of spaced walls 74 and 76 rise upward from the top of the block 60 such that each wall has a separate one of a pair of lateral faces 76 and 78 whose lower edge is common with the upper surface of a separate one of the shelves 66 and 68, respectively. The lateral face 78 on each of the walls 74 and 76 is common with the upper surface of the shelf 66, while the lateral face 80 on each wall has its lower edge in common with the upper surface of the shelf 68. The wall faces 78 and 80 are angled complementary to, for abutment with, the angled portions 58 on the connector ends 24 so that one of the connector ends is seated on a separate one of the shelves 66 and 68.

To engage one of the connectors 12 and 12′ of FIGS. 1 and 2 in the nest 10, the fastener 62 is initially loosened, and then the block is rotated to position the appropriate one of the shelves 66 and 68 opposite the block 28. The block 28 is itself displaced the appropriate distance from the block 60, depending on the length of the connector 12 or 12′. Finally, the slide 42 is displaced to either its forward or rearward position, depending on which of the connectors 12 and 12′ is to be accommodated.

The foregoing discloses a universal nest 10 which is capable of seating each of a separate one of a pair of ribbon connectors 12 and 12′ whose ends 24 are at heights $h_1$ and $h_2$, respectively. The nest 10 affords the advantage of not only accommodating the connectors 12 and 12′ of separate heights, but also affords the advantage of accommodating connectors of different lengths.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A universal nest for seating a separate one of a first and second connector, each having a pair of opposed ends, the ends of the first and second connectors being of a first and a second height, respectively, the nest comprising:

a base plate;

first support means of a first height slidably mounted on the base plate for movement therealong;

second support means having first and second opposed shelves of a first and a second height, respectively, the second support means being rotatably mounted to the base place to permit a separate one of the first and second shelves to be positioned opposite the first support means so an end of a separate one of the first and second connectors may be seated on a separate one of the shelves, respectively; and a slide of a thickness on the order of the difference between the first and second heights, the slide slidably mounted on the upper surface of the first support means for movement between a first position, at which a portion of the upper surface of the first support means is exposed to seat the other end of the first connector, and a second position, at which the slide completely overlies the upper surface of the first support means so that the slide serves to seat the other end of the second connector.

2. The apparatus according to claim 1 wherein the first support means is provided with means for engaging the end of a connector seated thereon.

3. The apparatus according to claim 2 wherein the engaging means comprises a pin rising upwardly from the upper surface of the first support means for engaging an end of the connector seated thereon.

4. The apparatus according to claim 2 wherein a pin rises upwardly from each of the opposed shelves on the second support means to engage the end of the connector seated thereon.

5. The apparatus according to claim 1 wherein the slide is provided with abutment means on its upper surface for abutting the end of the connector seated on the slide when the slide has been displaced to its second position.

6. The apparatus according to claim 1 wherein each of the opposed shelves on the second support means is provided with abutment means for abutting the end of the connector seated on the respective shelf.

7. A method for seating a separate one of a first and second connector having a pair of ends at a height $h_1$ and $h_2$, respectively, in a universal nest comprising the steps of:

slidably displacing a first support member, of a height $h_1$, longitudinally along a beam a distance from a second support member approximately equal to the length of the connctor;

sliding a slide, of a thickness $h_2-h_1$, along the top of the first support member between a first position, at which a portion of the upper surface of the support member is exposed to seat an end of the first connector, and a second position, at which the slide overlies the support members, and thereby provides a surface of a height $h_2$ to support an end of the second connector; and rotating the second support member to position a separate one of a pair of opposed shelves on the support member of a height $h_1$ and $h_2$, respectively, opposite the first support member to seat the opposite end of a separate one of the first and second connectors, respectively.

* * * * *